United States Patent
Chandra et al.

(10) Patent No.: US 9,967,028 B2
(45) Date of Patent: May 8, 2018

(54) SYSTEM AND A METHOD FOR FREE SPACE OPTICAL COMMUNICATIONS

(71) Applicant: Indian Institute of Technology Delhi, New Dehli (IN)

(72) Inventors: Vinod Chandra, New Delhi (IN); Devi Chadha, New Dehli (IN); Vineeta Dubey, New Dehli (IN)

(73) Assignee: Indian Institute of Technology Delhi, Delhi (IN)

( * ) Notice: Subject to any disclaimer, the term of this patent is extended or adjusted under 35 U.S.C. 154(b) by 0 days. days.

(21) Appl. No.: 14/918,032

(22) Filed: Oct. 20, 2015

(65) Prior Publication Data

US 2016/0119059 A1   Apr. 28, 2016

(30) Foreign Application Priority Data

Oct. 22, 2014   (IN) .......................... 3032/DEL/2014

(51) Int. Cl.
| | |
|---|---|
| *H04B 10/11* | (2013.01) |
| *H04B 1/00* | (2006.01) |
| *H04B 17/00* | (2015.01) |
| *H04B 7/08* | (2006.01) |
| *H04B 10/112* | (2013.01) |

(52) U.S. Cl.
CPC ................................ *H04B 10/1129* (2013.01)

(58) Field of Classification Search
None
See application file for complete search history.

(56) References Cited

U.S. PATENT DOCUMENTS

| 4,282,406 A | * | 8/1981 | Yato ........................ G10L 25/90 |
| | | | 324/76.33 |
| 4,641,373 A | * | 2/1987 | Shutterly ............... H04B 10/29 |
| | | | 398/62 |

(Continued)

FOREIGN PATENT DOCUMENTS

| CN | 103138892 | 6/2013 |
| WO | 2012144108 | 10/2012 |

OTHER PUBLICATIONS

Majid Safari, Relay-Assisted Free-Space Optical Communication, IEEE Transactions on Wireless Communications, Dec. 2008, vol. 7, No. 12.

(Continued)

*Primary Examiner* — Oommen Jacob
(74) *Attorney, Agent, or Firm* — Dinsmore & Shohl, LLP (57) ABSTRACT

Diversity combining schemes have been extensively used in wireless and free space optical communication systems. The present invention of a system and method for free space optical communications where multiple gain combiner (MGC) provides a better performance as compared to selection combining (SC) and equal gain combining (EGC) and can also be used for wireless applications. It also gives a cost effective solution with a minimal degradation in quality when maximal ratio combining (MRC) is compared in terms of hardware complexity and implementation cost. There is no need for present channel state information. Also, Adaptive weight adjustment is not required in present invention. Therefore, the MGC of system and method disclosed in the present invention is a simple, cost effective and high performance diversity combiner.

11 Claims, 5 Drawing Sheets

(56) References Cited

U.S. PATENT DOCUMENTS

| | | | | |
|---|---|---|---|---|
| 4,684,977 | A * | 8/1987 | Dischert | H04N 9/78 348/606 |
| 5,799,100 | A * | 8/1998 | Clarke | G06T 7/0012 382/132 |
| 6,385,181 | B1 * | 5/2002 | Tsutsui | H04B 1/70735 370/208 |
| 6,763,062 | B1 * | 7/2004 | Kohno | H01Q 3/2605 375/219 |
| 7,120,200 | B2 | 10/2006 | Alamouti | |
| 7,161,996 | B1 * | 1/2007 | Steele | H04B 1/707 370/342 |
| 8,385,455 | B2 | 2/2013 | Fujimoto | |
| 8,401,395 | B2 | 3/2013 | Xia et al. | |
| 8,576,772 | B2 | 11/2013 | Cox et al. | |
| 2002/0003842 | A1 * | 1/2002 | Suzuki | H04B 7/0854 375/259 |
| 2004/0081231 | A1 * | 4/2004 | Kim | H04B 1/7113 375/148 |
| 2004/0131038 | A1 * | 7/2004 | Kim | H04B 7/0634 370/342 |
| 2005/0037718 | A1 * | 2/2005 | Kim | H04B 1/7097 455/101 |
| 2006/0093065 | A1 * | 5/2006 | Thomas | H04B 7/0426 375/299 |
| 2006/0251421 | A1 * | 11/2006 | Arnon | H04B 7/10 398/73 |
| 2006/0285585 | A1 | 12/2006 | Sampath | |
| 2007/0109183 | A1 * | 5/2007 | Kimata | H04B 7/0617 342/354 |
| 2008/0080633 | A1 * | 4/2008 | Botha | H04B 1/7113 375/267 |
| 2009/0097856 | A1 * | 4/2009 | Sasai | H04B 10/1141 398/119 |
| 2011/0211652 | A1 * | 9/2011 | Debbah | H04J 11/003 375/295 |
| 2012/0008961 | A1 * | 1/2012 | Chen | H04B 10/613 398/119 |
| 2012/0128051 | A1 * | 5/2012 | Chiang | H04B 17/101 375/227 |
| 2012/0230685 | A1 * | 9/2012 | Jung | H04B 10/112 398/43 |
| 2013/0129012 | A1 | 5/2013 | Alamouti et al. | |
| 2013/0322278 | A1 | 12/2013 | Lee et al. | |
| 2016/0119059 | A1 * | 4/2016 | Chandra | H04B 10/1129 398/126 |

OTHER PUBLICATIONS

Li et al., Energy-Efficient Wireless Communications: Tutorial, Survey, and Open Issues, IEEE Wireless Communication, Dec. 2011.

J. Nicholas Laneman and Gregory W. Wornell, Energy-Efficient Antenna Sharing and Relaying for Wireless Networks, Research Laboratory of Electronics Massachusetts Institute of Technology, 7-10, Cambridge, MA, 2000 IEEE WCNC.

Fan et al., Design and Evaluation of an IDMA Cooperative Relay Free-Space Optical System, 2011 International Conference on Space Optical Systems and Applications, 358-362, Shanghai, China.

Chadi Abou-Rjeily and Serj Haddad, Cooperative FSO Systems: Performance Analysis and Optimal Power Allocation, Journal of Lightwave Technology, Apr. 1, 2011, vol. 29, No. 7.

Chadi Abou-Rjeily and Ahmad Slim, Cooperative Diversity for Free-Space Optical Communications: Transceiver Design and Performance Analysis, IEEE Transactions on Communications, Mar. 2011, vol. 59, No. 3.

Mehdi Karimi and Masoumeh Nasiri-Kenari, BER Analysis of Cooperative Systems in Free-Space Optical Networks, Journal of Lightwave Technology, Dec. 15, 2009, vol. 27, No. 24.

* cited by examiner

SYSTEM AND A METHOD FOR FREE SPACE OPTICAL COMMUNICATIONS

This application claims priority to Indian Patent Application No. 3032/DEL/2014, entitled "A System And A Method For Free Space Optical Communications" filed on Oct. 22, 201, which is incorporated by reference herein in its entirety.

TECHNICAL FIELD

The invention relates generally to wireless communications, more particularly to free space optical communication system and method thereof.

BACKGROUND

Free Space Optical (FSO) communication is an optical communication technology in which laser diode is used as a light source, photo detector is used for detecting the optical signal and air/free space acts as a medium for propagation. Further, FSO offers many features like cost effectiveness, protocol independence, high speed connectivity, ease of deployment and license free operation. It is a secure communication which can bring superior quality, wideband services to home or businesses. This has been included in US patent: Free space optics broadband home network U.S. Pat. No. 8,401,395 published on Mar. 19, 2013.

Conventionally, FSO communication finds applications in last-mile access, back-haul for wireless cellular networks, fiber backup and disaster recovery. Large bandwidth, low cost of installation and excellent security are attractive features of an FSO communication. But there is also problem of signal degradation with the usage of FSO systems because of fog, turbulence and misalignment. In order to combat the effects of turbulence, the technologies such as multiple input multiple output (MIMO) and relay networks with serial and parallel relay combinations have been used in M. Safari and M. Uysal, "Relay-assisted Free-space optical communication", IEEE Trans. on wireless Commun., vol. 7, no. 12, pp. 5441-5449, December 2008.

Conventionally, in radio frequency (RF) systems, the nature of broadcasting of signal is used with the advantage to send the signal through different relays, thereby enhancing the system performance. Further, these relays can be ordered in a serial or parallel fashion according to the need of user. Series combination (also known as multi hop communication) is generally used to increase the range of communication whereas parallel combination (also known as cooperative communication) is meant for increasing the system performance as described in J. N. Laneman and G W. Wornell, "Energy-efficient antenna sharing and relaying for wireless networks," in Proc. IEEE Wireless Communications and Networking Conf. (WCNC), Chicago, Ill., September 2000.

However, in the FSO network, multiple transmitters and receivers are used at each node in the mesh configuration. However, for cooperative communication, one of the transmitter-receiver can be used as relay without any extra cost. Further, relay nodes for cooperative communication are generally chosen from the existing communication network. Accordingly, it does not include any extra hardware requirement. However in the case of MIMO, extra hardware is always required to get good performance and accordingly, hardware requirement is at least double thereof in case of MIMO when compared to that of cooperative system.

Cooperative diversity technique for combating turbulence-induced fading over free-space optical (FSO) links has been demonstrated in Chadi Abou-Rjeily and Serj Haddad, "Cooperative FSO Systems: Performance Analysis and Optimal Power Allocation," Journal of Lightwave Technology, vol. 29, No. 7, April, 2011. Accordingly, they have developed a closed-form optimal solution for transmitting the entire optical power along the strongest link between the source and the destination nodes. In C. Abou-Rjeily and A. Slim, "Cooperative diversity for free-space optical communications: Transceiver design and performance analysis," IEEE Trans. Communication, vol. 59, No. 3, March 2011. Further, one-relay cooperative diversity scheme has been proposed and analysed thereof, for non-coherent FSO communications with intensity modulation and direct detection (IM/DD). Accordingly, the error performance is derived in semi-analytical and closed-form expressions in the presence and absence of background radiation.

Cooperative relay technique with pulse-position modulation (PPM) and optical interleave-division multiple-access for achieving spatial diversity and robust transmission performance to alleviate the degrading effects of atmospheric turbulence has been demonstrated in Jingyuan Fan, Xiaolin Zhou, and Jun Liu, "Design and Evaluation of an IDMA Cooperative Relay Free-Space Optical System," International conference on space optical systems and applications, 2011. Still further, a three-way FSO communication setup is proposed in M. Karimi and M. Nasiri-Kenari, "BER analysis of cooperative systems in free-space optical networks," J. of Lightw Technol., vol. 27, no. 24, pp. 5639-5647, December 2009. Accordingly, the cooperative protocol can be applied to achieve the spatial diversity without much increase in hardware. BER performance has been studied in different strategies in the presence of shot noise. They have shown comparison with direct link and MIMO.

Conventionally, diversity combining schemes have been extensively used in wireless and free space optical communication systems for cooperative and MIMO systems. There are the three diversity combining techniques which are subject of patents and publications in journals/books. These techniques are: Selection combining (SC), Equal gain combining (EGC) and Maximal ratio combining (MRC). Further, MRC gives the optimal performance; however it requires a priori knowledge of channel state conditions and adaptive weight adjustment of the diversity combiner. Still further, the diversity combining schemes for wireless communications have been patented earlier in US patent "Multi-antenna wireless communication method, multi-antenna wireless communication system, and multi-antenna wireless communication device" U.S. Pat. No. 8,385,455, published Feb. 26, 2013.

Generally, in wireless communication systems, the signal is sent through different relays to enhance system performance. When the relays are ordered in parallel combination (also known as cooperative communication), it gives the advantage of enhanced system performance. Relay nodes can be chosen in the network as per the requirement of cooperation and hence it does not include any extra hardware requirement like multiple input multiple output (MIMO) system. Cooperative communication has been discussed in "Cooperative multiple access in wireless networks" U.S. Pat. No. 8,576,772 published on Nov. 5, 2013. This US document discloses the performance on MIMO systems. The present invention discusses the system model of FSO cooperative communication system.

In U.S. Pat. No. 7,120,200 "Transmitter diversity technique for wireless communications", AlamoutiSiavash and TarokhVahid explain a simple block coding arrangement is created with symbols transmitted over a plurality of transmit channels, in connection with coding that comprises only simple arithmetic operations, such as negation and conjugation. Accordingly, the diversity created by the transmitter utilizes space diversity and either time or frequency diversity. However, MRC which is an optimum performing diversity combining technique needs feedback and adaptive weight adjustment.

In CN101199124, "Method and apparatus for optimum selection of MIMO and interference cancellation", QUALCOMM INC provides systems and methods for facilitating interference nulling and rank prediction in an access terminal. Further, a plurality of receiver demodulator types are implemented to the access terminal, and an interference covariance matrix is estimated at the access terminal. Still further, SNRs (Signal to Noise Ratios) are calculated for the various receiver demodulator types, and an optimum rank and associated CQI information are identified and generated thereof, respectively. Furthermore, the information is then transmitted to an access point. Here, the scheme disclosed in the document needs a priori knowledge of channel quality information.

WO2012144108, given by Endo Kazuomi and Hashimoto Yoichi named as "Optical reception method and optical receiver" allows the reception in which receive sensitivity does not depend upon polarization state in reception of an M-ary phase optical signal. However, in this optical reception method, an M-ary phase optical signal of a single polarization is separated into a first optical signal and further a second optical signal of mutually orthogonal polarization. Accordingly, the ratio of the power of the first optical signal to the power of the second optical signal is calculated. Furthermore, the difference between the phase of the first optical signal and the phase of the second optical signal is calculated as an amount of compensation, whereupon, on the basis of the ratio and the amount of compensation, the first optical signal and the second optical signal are combined using amaximal ratio combining method. Thence, the amount of compensation is modified on the basis of the ratio. However, the invention deals with SISO (Single Input Single Output) system whose BER performance is not optimal.

Methods and systems of diversity combining, namely, MRC, EGC and SC in free space optical communications as known in the prior art have drawbacks associated therewith including:
1. Complexity in hardware in case of MRC.
2. Prior knowledge of channel state information in case of MRC.
3. Adaptive weight adjustment in case of MRC.
4. Poor bit error rate (BER) in case of EGC and SC Accordingly, there is a need for eliminating the drawbacks associated with the systems and methods of diversity combining in free space optical communication systems as known in the prior art. Further, there is a need for developing a method that involves less number of hardware components, simple approach and cost-effectiveness.

OBJECTS

The main object of the present invention is to provide a system for free space optical communication system.

Another object of the present invention is to decrease the hardware complexity.

Yet another object of the present invention is to provide a simple and a cost effective system.

The present invention also provides a method for free space optical communication system.

Another object of the present invention is to provide a method for free space optical communication system which is free from adaptive weight adjustment.

Yet another object of the present invention is to provide a method for free space optical communication system without any channel state information.

Still another object of the present invention is to provide a method for free space optical communication system with good bit error rate (BER) performance.

SUMMARY

Accordingly, the present invention provides a system for free space optical communications comprising a plurality of transmitters configured to receive data from a data source, to encode the received data, to convert encoded data into an optical signal and to point out the optical signal in the direction of a plurality of receivers. Data source sends the data to NRZ driver which encodes the data and transmits the data to a plurality of transmitters which basically consists of the laser diodes pointing out in the direction of destination and different relays. The laser diodes are used to convert electrical signal into optical signal. Optionally, at least one relay node comprising a set of a receiver, an opto-electronic-opto converter and a transmitter. A plurality of receivers configured to receive the optical signal from the transmitter or the at least one relay node through free space optical communication and to convert the optical signal into an electrical signal and to shape the electrical signal. A multiple gain combiner (MGC) comprises of a set of a bank of weighted factors, combiners and a maximum output selector. A bank of weighted factors is used to collect the signals with unequal weights from the plurality of receivers. A plurality of combiners receive signals from all the available weighted factors from the bank of weighted factors. Two signals are combined using a combiner in a single relay cooperative communication system and it increases by one as the number of indirect links increase with the increase in the number of relays. Total eight combiners are used when we are using single relay cooperative communication system with granularity of 0.1. A maximum output selector is configured to receive the signals from the plurality of combiners and to select the strongest signal as an output by using maximum output selector.

In an embodiment of the present invention, the electrical signal from the plurality of receivers below a pre-determined value is passed onto the transmitter by the way of a regenerator.

In another embodiment of the present invention, the transmitter used comprises a non-return to zero (NRZ) driver to encode the received data.

In yet another embodiment of the present invention, the transmitter used comprises a laser diode to convert an encoded data into an optical signal.

In another embodiment of the present invention, the number of transmitters used, are in the range of 2 to 4.

In still another embodiment of the present invention, the receiver used comprises a photo detector to convert an optical signal into an electrical signal.

In another embodiment of the present invention, the number of receivers used, are in the range of 2 to 4.

In yet another embodiment of the present invention, the photo detector used is a photodiode.

In still another embodiment of the present invention, the receiver used comprises a filter configured to pass signals at a predetermined frequency range to the bank of weighted factors, to pass signals below a predetermined frequency to a regenerator.

In yet another embodiment of the present invention, the transmitter used is optically aligned with the receiver, according to the line of sight for a direct link.

In still another embodiment of the present invention, the relay node used is optically aligned with the transmitter and the receiver according to the line of sight for an indirect link.

In another embodiment of the present invention, the number of relay nodes used, are in the range of 1 to 3.

The present invention also provides a method for free space optical communications comprising: receiving input data at a transmitter from data source and encoding the input data by way of a coding driver to obtain an encoded input data at the transmitter and modulating the encoded input data onto a laser beam by way of a laser diode to obtain a modulated laser beam at the transmitter. Laser diode is used at transmitter to convert electrical signal into optical signal and photodiode is used at receiver to convert optical signal into electrical signal directing the modulated laser beam at a receiver, directly or indirectly through a relay node to the destination. Then, receiving the modulated laser beam including the encoded input data by way of the receiver and converting the modulated laser beam into an electrical signal by way of the receiver. Detection of the optical signal is done by photodiode at the receiver. Then, passing the electrical signal above a pre-determined frequency range from a filter of the receiver to a bank of weighted factors and then receiving the electrical signals from the filter to the bank of weighted factors with unequal weights to obtain output signals. The output signals from the bank of weighted factors are fed to the combiners of MGC and a maximum output selector is used to select the strongest signal as a final output signal.

In another embodiment of the present invention, the electrical signal below the pre-determined frequency range is passed from the filter to a regenerator.

In still another embodiment of the present invention, the electrical signal is regenerated at the regenerator and sent back to the transmitter.

These and other features, aspects, and advantages of the present subject matter will become better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF ACCOMPANYING DRAWINGS

Further objects and advantages of this invention will be more apparent from the ensuing description when read in conjunction with the accompanying drawings wherein.

DETAILED DESCRIPTION OF THE INVENTION

The system for free space optical communications of the present invention will now be described in detail with reference to the accompanying drawings. Description of well-known components and techniques are omitted so as to not unnecessarily obscure the embodiments herein. The example used herein is intended merely to facilitate an understanding of ways in which the embodiments herein may be practiced and to further enable those of skill in the art to practice the embodiments herein. Accordingly, the example should not be construed as limiting the scope of the embodiments herein.

The present invention relates to Amplify and forward (AF) Free Space Optical cooperative system for the performance analysis of this invention. Relays are placed in parallel combination to provide the advantage of diverse paths in cooperative systems and the signal is detected and amplified as per the requirement at relay node in AF relaying system. More specifically, in the AF case, opto-electronic-opto (O-E-O) converter is mounted at a relay node which gives the advantage of amplify and forward. Symmetrical and asymmetrical channel models are considered in the system. All the links face same turbulence in case of symmetrical channel environment. However, the direct and indirect links face different turbulence in the asymmetrical channel environment.

Combining Techniques

Figure 1:
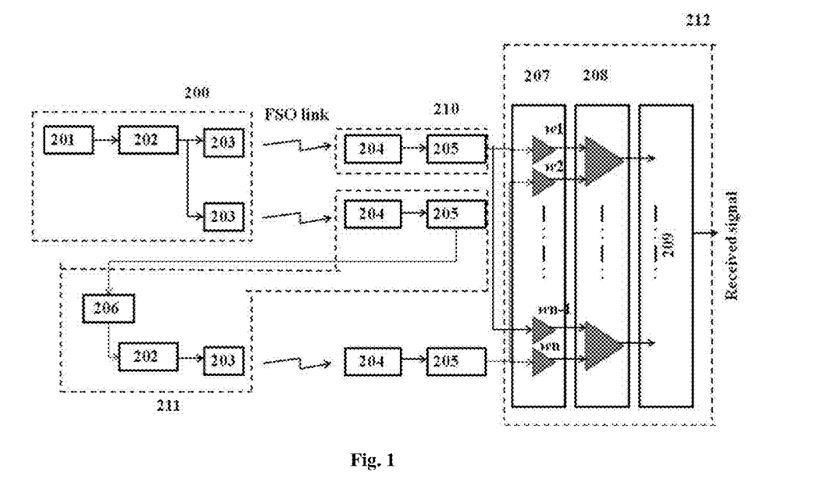
FIG. 1 shows a block diagram of a single relay cooperative FSO system with Multiple Gain Combiner (MGC).

The present invention relates to a free space optical communication system for a diversity combining technique. FIG. 1 shows a block diagram of a single relay cooperative FSO system with Multiple Gain Combiner (MGC).

Three types of combining techniques of the received signals are compared at the receiver. In Maximal Ratio Combining (MRC), the received signals are weighted with respect to their signal to noise (SNR) ratios and summed thereof. Further, in case of Equal Gain Combining (EGC), the received signals are summed coherently with equal weights. Furthermore, in case of Selective Combining (SC) the strongest signal is selected from the two received signals.

In order to eliminate the drawbacks associated with the prior art methods and systems, the present invention envisages a new diversity combining technique apart from already published in journals and patents. It has been named as multiple gain combiners (MGC). There are three blocks in the MGC: bank of weighted factors (207), combiners (208) and maximum output selector (209) as shown in FIG. 1.

A plurality of transmitters (200) are configured to receive data from a data source (201), to encode the received data, to convert encoded data into an optical signal and to point out the optical signal in the direction of a plurality of receivers (210). The transmitter (200) used comprises a non-return to zero (NRZ) driver to encode the received data. Other encoding formats can also be used.

Optionally, at least one relay node (211), each relay node (211) comprising a set of a receiver (210), a regenerator (206) and a transmitter (200).

A plurality of receivers (220) is configured to receive the optical signal from the transmitter (200) or at least one relay node (210) through free space optical communication, to convert the optical signal into an electrical signal, and to shape the electrical signal. Transmitter (200) sends the signal to two laser diodes (203) which are pointed out in the direction of direct link and relay node. The signal is detected at photodiode (204), regenerated by regenerator (206) and is again converted into optical signal which is then directed to the destination. Two photodiodes (204) are mounted at receiver (220) to convert the optical signal into electrical signal and the Multiple Gain Combiner (MGC) (212) performs the function of diversity combining.

Data source (201) sends the binary data stream to NRZ driver (202) to encode the signal into source code. Laser diode (203) converts the electrical signal or electrical signal into optical signal. Thereafter, the optical signal is transmitted via Free Space Optical (FSO) link to photo detector (204) which basically converts the optical signal into electrical or electrical signal. Thereafter, Low pass Bessel filter (205) is used to shape the signal at the receiver (210) and regenerator (206) regenerates the signal and sends it to next indirect link from relay node (211) to destination. A bank of weighted factors (207) collects the signals from all the possible diverse links with unequal weights and combined at Combiner (208). Total number of combiners used are eight for single relay cooperative communication system with granularity of 0.1.

Thereafter, the best possible signal out of the maximum output selector (209) is chosen as a received signal. Therefore, in this way Multiple Gain Combiner (MGC) provides a good performance with low hardware complexity. However, the prior art discusses the need for present channel state information or adaptive weight adjustment. Therefore, the present invention makes MGC a simple, cost effective and optimal performance diversity combiner.

Figure 2:
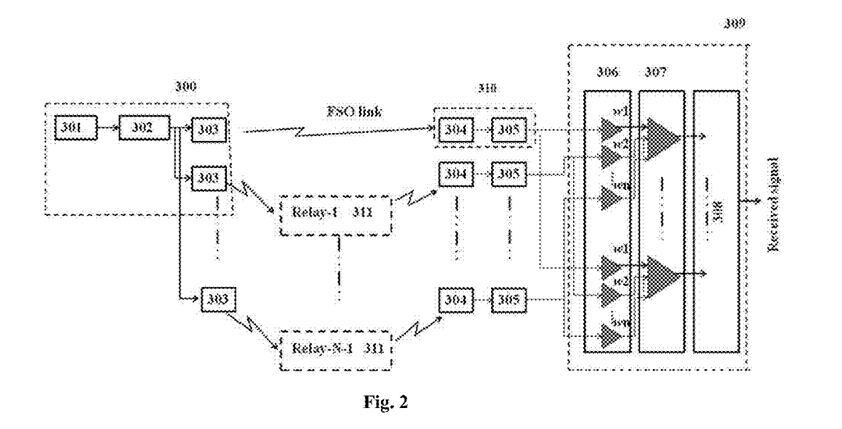
FIG. 2 shows a block diagram of a cooperative FSO system with MGC for N−1 number of relays.

FIG. 2 shows a general block diagram of FSO cooperative communication system with MGC for N−1 number of relays. Data source (301) sends the binary data stream to NRZ driver (302) to encode the signal into source code. Laser diode (303) converts the electrical signal into optical signal. The same signal is fed to all N laser diodes for directing towards one direct link and N−1 indirect links. Accordingly, N number of laser diodes (303), are used to transmit the optical signal and N number of photo diodes (304) are used to convert the optical signal into electrical signal. Low pass Bessel filter (305) is used to shape the signal at the receiver (310). The same signal from NRZ driver (302) is fed to the next laser diodes (303) which are directing towards the indirect links and sent to the destination via relay nodes (311). A bank of weighted factors (306) collects the signals from all the possible diverse links with unequal weights and combined at Combiner (307). Thereafter, the best possible signal out of the maximum output selector (308) is chosen as a received signal. The combination of bank of weighted factors (306), combiner (307) and maximum output selector (308) is collectively called as multiple gain combiner (309). Two signals are combined using a Combiner in a single relay cooperative communication system and the number of signal increase by one as the number of indirect links increases with an increase in the number of relays.

Figure 3:
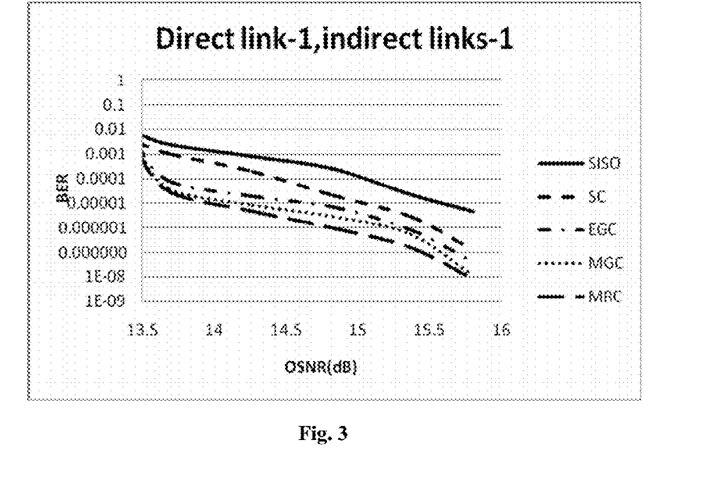
FIG. 3 shows comparative results of diversity combining schemes for symmetrical channel environment with standard deviation of 1 for all the links.

FIG. 3 represents the BER vs OSNR performance for single relay cooperative FSO system in a symmetrical channel environment where the value of standard deviation for turbulence of all the links (Direct and indirect) is taken as 1.

Atmospheric Channel Model (Gamma-Gamma Channel Model)

The channel model is described which has been used to get simulation results given in Table II and FIG. 4 to FIG. 10 are based on calculations using this channel model.

From the plurality of receivers, the received signal at any of the receivers is given by $$y = hx + n \quad (1)$$

where x is the transmitted signal, h is the normalized channel fading coefficient considered to be constant over a large number of transmitted bits, and n is All White Gaussian Noise (AWGN).

Optical channel is affected by parameters such as scattering and turbulence. Gamma-Gamma probability density function (pdf) closely models experimental results over low to high turbulence strengths. It is most suitable for studying link performance parameters for slow fading conditions. Therefore, Gamma-Gamma model is used as a channel model for both the direct and indirect paths.

The irradiance of optical field in Gamma-Gamma channel is defined as the product of two random processes, i.e. $I = I_x I_y$, where $I_x$ arises from large scale turbulent eddies and $I_y$ from small-scale eddies leading to the Gamma-Gamma pdf, and the following expressions for the function have been taken from Kahn and Zhu [8].

$$f(I) = \frac{2(\alpha\beta)^{\left(\frac{[\alpha+\beta]}{2}\right)} I^{\frac{(\alpha+\beta)}{2}-1} K_{\alpha-\beta}(2\sqrt{\alpha\beta I})}{\Gamma\alpha\Gamma\beta}, I > 0 \quad (2)$$

where $K_{\alpha-\beta}(.)$ is the modified Bessel function of the second kind of order $\alpha-\beta$. Here, $\alpha$ and $\beta$ are the effective number of small-scale and large scale eddies of the scattering environment given below, $\Gamma$ is the gamma function.

These parameters can be directly related to atmospheric conditions according to $$\alpha = \left[\exp\frac{0.40\beta_0^2}{(1+0.18d^2+0.56\beta_0^{12/5})^{\frac{7}{6}}} - 1\right]^{-1} \quad (3)$$

$$\beta = \left[\exp\frac{0.51\beta_0^2}{(1+0.9d^2+0.62\beta_0^{12/5})^{\frac{5}{6}}} - 1\right]^{-1}$$

Where $\beta_o=0.5Cn^2k^{7/6}L^{11/6}$ and $d=(kD^2/4L)^{1/2}$. Here, $k=2\pi/\lambda$ is the optical wave number, $\lambda$ is the wavelength and D is the diameter of the receiver collecting lens aperture. $Cn^2$ is the index of the refraction structure parameter and is altitude dependent. The model is explained in Zhu and Joseph M. Kahn, "Free-space optical communication through atmospheric turbulence channels", IEEE Transactions on Communication, vol. 50. no. 8, pp 1293-1300, August 2002.

EXAMPLES

Example 1

Validation of MGC Performance by Hardware Simulation

Rsoft-Optsim is a software tool for the design and simulation of optical communication systems at the signal propagation level. With state-of-the-art simulation techniques, an easy-to-use graphical user interface and lab-like measurement instruments, this software is used by engineers in both academic and industrial organizations. Its features are:
1. Virtual prototyping of optical communication systems for increased productivity and
   reduced time to market.
2. Design optimization for enhanced performance and reduced costs.
3. Interfaces with third-party tools such as MATLAB and the Luna Optical Vector Analyser.
4. Advanced electrical modelling with embedded SPICE engine.
5. Support for multiple parameter-scans-based optimization.

The performance evaluation in terms of Bit Error rate (BER) with respect to Optical Signal to Noise Ratio (OSNR) was carried out using Rsoft-Optsim by transmitting On-Off Keying (OOK) modulated data streams using Gamma-Gamma channel model. Specifically, the range for standard deviation of turbulence is 0.1 to 0.7 for weak turbulence, 0.7 to 1.5 for moderate turbulence and greater than 1.5 for highly turbulent environments. Different combining techniques are used at the receiver (210). The link length for a direct link is 1.414 Km and link length for each indirect links is 1 Km. Direct link is kept at a standard deviation of 1 and different cases for indirect links have been considered.

FIG. 3 represents the BER vs OSNR performance for single relay cooperative FSO system in a symmetrical channel environment where the value of standard deviation for turbulence of all the links is taken as 1. If the results of all the combining schemes with SISO are compared, the SNR improvement of 0.5 dB for BER $1*10^{-5}$ is shown with the use of selection diversity. EGC, MGC and MRC provide the SNR improvement of 1 dB, 1.5 dB and 1.7 dB respectively over SISO for BER of $1*10^{-5}$. The performance of MGC is very close to the performance of MRC which gives the best results as compared to all the combining schemes already in use. By using MGC very good results are obtained with the simplicity of hardware. The spacing of 0.1 for gain factors is considered in this set up. If the spacing less than 0.1 is provided, even better results with MGC can be obtained. Decreasing the spacing for gain factors results in more number of gain factors and more number of combiners, but it does not include a significant cost to signal processing chip.

Figure 4:
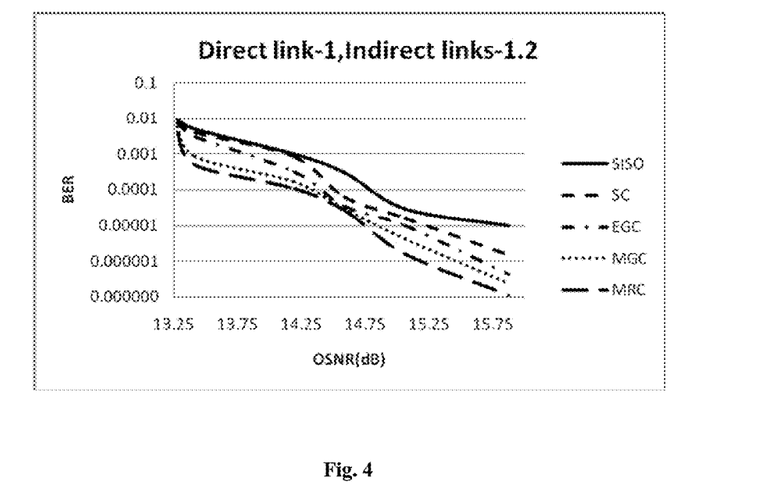
FIG. 4 shows comparative results of diversity combining schemes for asymmetrical channel environment with standard deviation of 1 for direct link and standard deviation of 1.2 for both the indirect links.
Figure 5:
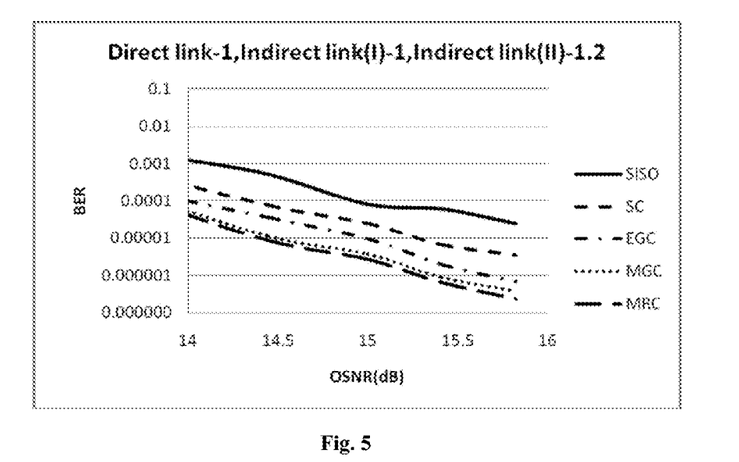
FIG. 5 shows comparative results of diversity combining schemes for asymmetrical channel environment with standard deviation of 1 for direct link and Indirect link (I) and standard deviation of 1.2 for indirect link (II).
Figure 6:
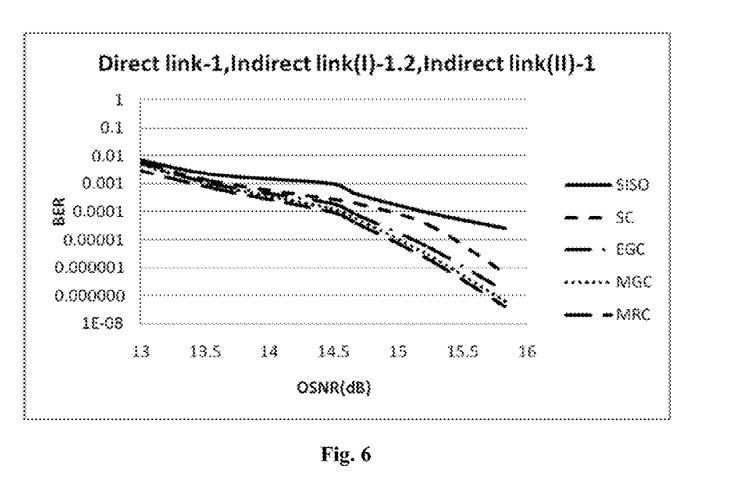
FIG. 6 shows comparative results of diversity combining schemes for asymmetrical channel environment with standard deviation of 1 for direct link and indirect link (II) and standard deviation of 1.2 for indirect link (I).
Figure 7:
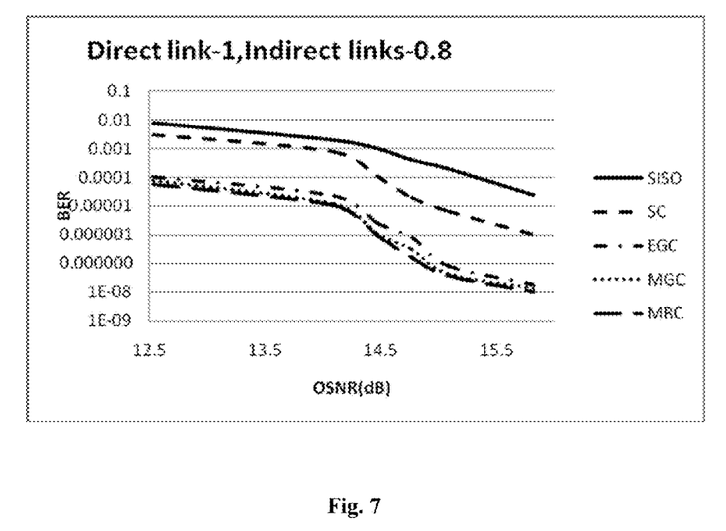
FIG. 7 shows comparative results of diversity combining schemes for asymmetrical channel environment with standard deviation of 1 for direct link and standard deviation of 0.8 for both the indirect links.
Figure 8:
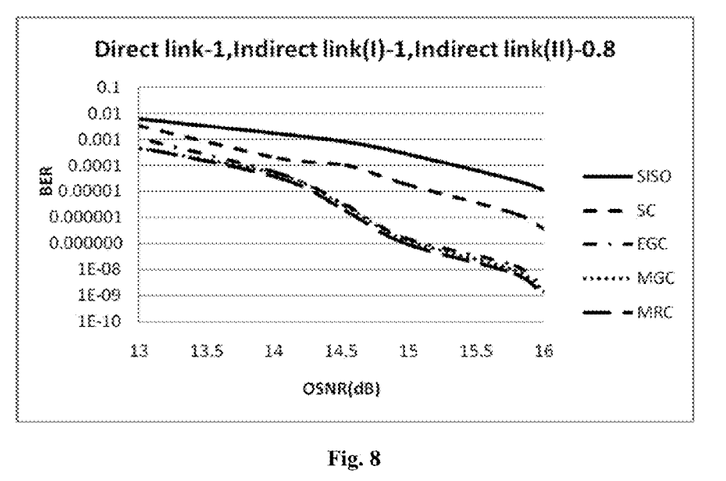
FIG. 8 shows comparative results of diversity combining schemes for asymmetrical channel environment with standard deviation of 1 for direct link and Indirect link (I) and standard deviation of 0.8 for indirect link (II).
Figure 9:
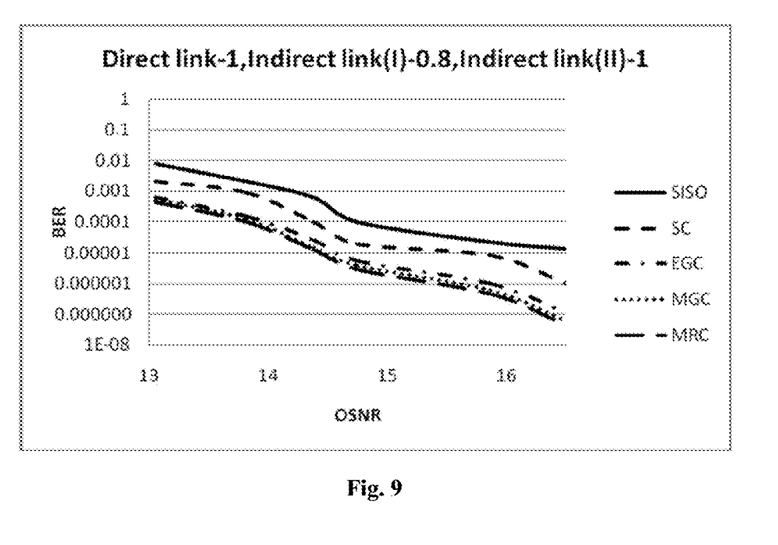
FIG. 9 shows comparative results of diversity combining schemes for asymmetrical channel environment with standard deviation of 1 for direct link and indirect link (II) and standard deviation of 0.8 for indirect link (I). The range for standard deviation has been provided for different level of turbulence While the invention is described in conjunction with the illustrated embodiment, it is understood that it is not intended to limit the invention to such embodiment. On the contrary, it is intended to cover all alternatives, modifications and equivalents as may be included within the spirit and scope of the invention disclosure as defined by the claims.

FIG. 4 shows comparative results of diversity combining schemes for asymmetrical channel environment with standard deviation of 1 for direct link and standard deviation of 1.2 for both the indirect links.

FIG. 5-FIG. 9 shows similar performance of MGC (Multiple Gain Combiner) for different atmospheric channel conditions where the performance of MGC is very close to that of MRC with low hardware complexity and low cost.

The following Table I, provides the specifications for different simulation parameters.

TABLE I

| No. | Details | Specifications |
|---|---|---|
| 1. | Transmission wavelength | 1550 nm |
| 2. | Transmission data rate | 1 Gbps |
| 3. | Laser type | CW Lorentzian |
| 4. | Modulation type | External |
| 5. | Modulation format | OOK |
| 6. | Photo Detector type | Photo diode |
| 7. | Responsivity of photo diode | 0.75 A/W |
| 8. | Direct link length | 1.414 Km |
| 9. | Indirect link length | 1 Km (each) |

The following Table II shows a comparative result of Bit Error Rate (BER) for Single Input Single Output (SISO) and different cooperative diversity combining schemes using single relay for OSNR=15 dB.

From Table II, it can be concluded that cooperative communication is always a better performing solution as compared to SISO. The performance of MGC of the present invention is very close to the optimum performance scheme MRC. MGC is always providing better performance as compared to two other combining schemes (SC and EGC) for all the channel environments.

TABLE II

| | SISO | SC | EGC | MGC | MRC |
|---|---|---|---|---|---|
| Symmetrical channel with standard deviation-1 | $1*10^{-4}$ | $1.6*10^{-5}$ | $4*10^{-6}$ | $1*10^{-6}$ | $4.8*10^{-7}$ |
| Asymmetrical channel with standard deviation-1 for direct link and 1.2 for indirect links | $8*10^{-5}$ | $5.6*10^{-5}$ | $9.8*10^{-6}$ | $4.3*10^{-6}$ | $1.6*10^{-6}$ |
| Asymmetrical channel with standard deviation-1 for direct link and 0.8 for indirect links | $1.2*10^{-4}$ | $6.9*10^{-6}$ | $9.2*10^{-8}$ | $6.3*10^{-8}$ | $4.2*10^{-8}$ |
| Asymmetrical channel with standard deviation-1 for direct link and indirect link (I) and 1.2 for indirect link(II) | $8.2*10^{-5}$ | $4.1*10^{-5}$ | $6.8*10^{-6}$ | $3.2*10^{-6}$ | $8.8*10^{-7}$ |
| Asymmetrical channel with standard deviation-1 for direct link and indirect link (II) and 1.2 for indirect link(I) | $9.6*10^{-5}$ | $6.4*10^{-5}$ | $8.5*10^{-6}$ | $5.8*10^{-6}$ | $9.7*10^{-7}$ |

TABLE II-continued

| | SISO | SC | EGC | MGC | MRC |
|---|---|---|---|---|---|
| Asymmetrical channel with standard deviation-1 for direct link and indirect link (I) and 0.8 for indirect link(II) | $1*10^{-4}$ | $7.8*10^{-6}$ | $1.2*10^{-7}$ | $8.1*10^{-8}$ | $7.2*10^{-8}$ |
| Asymmetrical channel with standard deviation-1 for direct link and indirect link (II) and 0.8 for indirect link(I) | $9.4*10^{-5}$ | $7.2*10^{-6}$ | $8.2*10^{-7}$ | $6.78*10^{-8}$ | $6.7*10^{-8}$ |

The following Table III shows the legends used in the FIG. 1 and FIG. 2

TABLE III

| | |
|---|---|
| 200 | Transmitter |
| 201 | Data Source |
| 202 | NRZ Driver |
| 203 | Laser Diode |
| 204 | Photo Diode |
| 205 | Low Pass Bessel Filter |
| 206 | Regenerator |
| 207 | Bank of Weighted factors |
| 208 | Combiners |
| 209 | Maximum output selector |
| 210 | Receiver |
| 211 | Relay |
| 212 | Multiple Gain Combiner (MGC) |
| 300 | Transmitter |
| 301 | Data Source |
| 302 | NRZ Driver |
| 303 | Laser Diode |
| 304 | Photo Diode |
| 305 | Low Pass Bessel Filter |
| 306 | Bank of Weighted factors |
| 307 | Combiner |
| 308 | Maximum output selector |
| 309 | Multiple Gain Combiner (MGC) |
| 310 | Receiver |
| 311 | Relay |

Advantages of the Invention

1. The system for free space optical communication provides better bit error rate (BER) performance when compared with selection combining (SC) and equal gain combining (EGC) schemes.
2. The system for free space optical communication is a cost effective solution as compared to maximal ratio combining as it makes no use of present channel state information and no adaptive weight adjustment is required for implementation of this diversity combining scheme.
3. MGC provides a high performance with less hardware complexity as compared to Maximal Ratio Combining (MRC) method for diversity combining
4. MGC provides simple and cost-effective system.

Although the subject matter has been described in considerable detail with reference to certain preferred embodiments thereof, other embodiments are possible. As such, the spirit and scope of the appended claims should not be limited to the description of the preferred embodiment contained therein.

We claim:

1. A system for free space optical communication, comprising:
   a) a plurality of transmitters (200) wherein each transmitter (200) is configured:
      to receive data from a data source (201);
      to encode the received data;
      to convert encoded data into an optical signal; and
      to point out the optical signal in the direction of a plurality of receivers (210);
   b) and optionally, at least one relay node (211), each relay node (211) comprising a set of a receiver (210), a regenerator (206) and a transmitter (200);
   c) a plurality of receivers (210) wherein each receiver (210) is configured:
      to receive the optical signal from the transmitter (200) or the at least one relay node (211) through free space optical communication;
      to convert the optical signal into an electrical signal; and
      to shape the electrical signal;
   d) a multiple gain combiner (212) which comprises:
      a bank of weighted factors (207) to collect the signals obtained from the plurality of receivers (210) after shaping and without reliance upon present channel state information and/or adaptive weight adjustment;
   e) a plurality of combiners (208) wherein each combiner (208) receiving signals from all the weighted factors from the bank of weighted factors (207);
   f) a maximum output selector (209) configured to receive the signals from the plurality of combiners (208) and to select the strongest signal as an output; and
   wherein the receiver (210) comprises a filter (205) configured to pass signals at a predetermined frequency range to the bank of weighted factors (207), to pass signals below a predetermined value to a regenerator (206).

2. The system as claimed in claim 1, wherein the signal from the plurality of receivers (210) at a pre-determined frequency range is passed onto the transmitter (200) by the way of a regenerator (206).

3. The system as claimed in claim 1, wherein the regenerator (206) of the relay node (210) is opto-electronic-opto (O-E-O) type.

4. The system as claimed in claim 1, wherein the transmitter (200) comprises a non-return to zero (NRZ) driver (202) to encode the received data.

5. The system as claimed in claim 1, wherein the transmitter (200) comprises a laser diode (203) to convert an encoded data into an optical signal.

6. The system as claimed in claim 1, wherein the receiver (210) comprises a photo detector (204) to convert an optical signal into an electrical signal.

7. The system as claimed in claim 6, wherein the photo detector (204) used is a photodiode.

8. The system as claimed in claim 1, wherein the transmitter (200) is optically aligned with the receiver (210) according to the line of sight for a direct link.

9. The system as claimed in claim 1, wherein the relay node (211) is optically aligned with the transmitter (200) and the receiver (210) according to the line of sight for an indirect link.

10. A method for free space optical communication, comprising:

a) receiving input data at a transmitter (200);
b) encoding the input data received by way of a coding driver (202) to obtain an encoded input data at the transmitter (200);
c) modulating the encoded input data onto a laser beam by way of a laser diode (203) to obtain a modulated laser beam at the transmitter (200);
d) directing the modulated laser beam at a receiver (210), directly or indirectly through a relay node (211);
e) receiving the modulated laser beam including the encoded input data by way of the receiver (210);
f) converting the modulated laser beam into an electrical signal by way of the receiver (210);
g) passing the electrical signal at a pre-determined frequency range below a predetermined value from a filter (205) of the receiver (210) to a bank of weighted factors (207) by way of a regenerator (206) and without reliance upon present channel state information and/or adaptive weight adjustment;
h) receiving the electrical signals from the filter (205) to the bank of weighted factors (207) with unequal weights to obtain output signals;
i) combining the output signals from the bank of weighted factors (207) at the combiners (208); and
j) receiving the plurality of maximum output signals from the combiners (208) at a maximum output selector (209) to select the strongest signal as a final output signal.

11. The method as claimed in 10, wherein the electrical signal is regenerated at the regenerator (206) and sent back to the transmitter (200).

* * * * *